Patented Jan. 15, 1924.

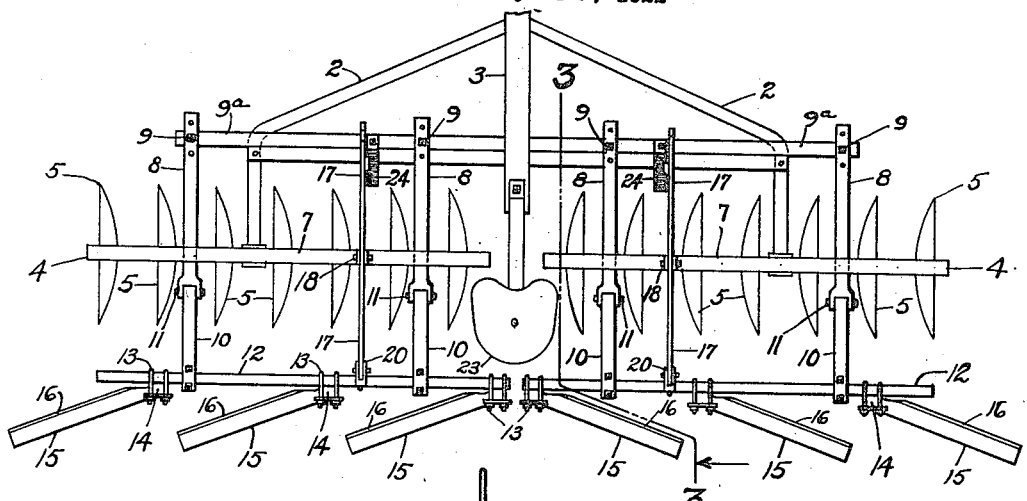
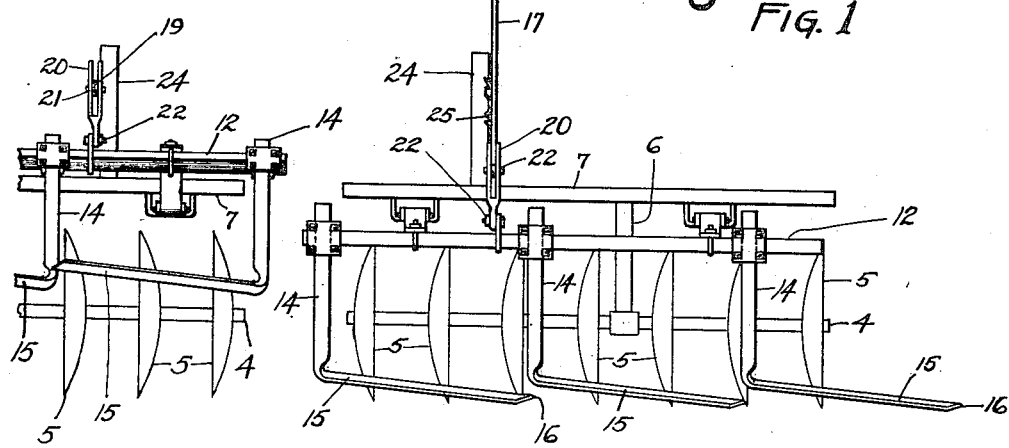
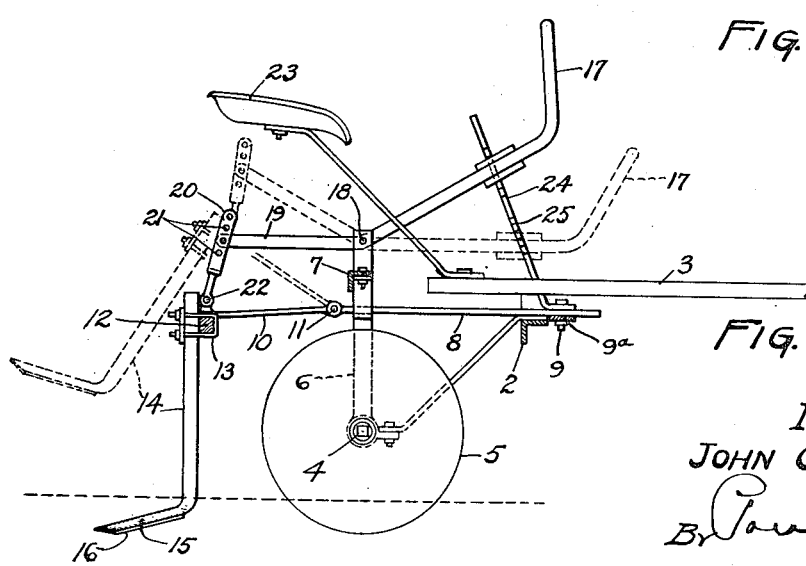

1,480,996

UNITED STATES PATENT OFFICE.

JOHN COPPINGER, OF BROADVIEW, MONTANA.

WEED-CUTTING MACHINE.

Application filed April 3, 1922. Serial No. 549,073.

*To all whom it may concern:*

Be it known that I, JOHN COPPINGER, a citizen of the United States, resident of Broadview, county of Yellowstone, State of Montana, have invented certain new and useful Improvements in Weed-Cutting Machines, of which the following is a specification.

The object of my invention is to provide an attachment for a ground-working machine, having a series of knives for cutting weed stalks and roots below the surface of the ground, the machine being particularly adapted for use in semi-arid regions where dry farming is practiced, and it is desirable to destroy weeds and noxious grasses without disturbing or stirring up the top soil or mulch.

The invention consists generally in various constructions and combinations, all as hereinafter described and particularly pointed out in the claims.

In the accompanying drawings forming part of this specification,

Figure 1 is a plan view of a disc harrow with my invention applied thereto,

Figure 2 is a rear elevation of the same, showing one group of weed cutting knives in a raised inoperative position, Figure 3 is a sectional view on the line 3—3 of Figure 1.

In the drawing, 2 represents the frame of the harrow, having a suitable draft pole 3 connected with shafts 4 whereon the harrow discs 5 are mounted. Upright standards 6 are supported by the shafts 4 having connecting bars 7 between them above the harrow discs, and draft bars 8 are secured at 9 to a transverse bar 9ª mounted on the forward portion of the harrow frame and project to a point in the rear of the standards 6. These draft bars are preferably arranged in pairs, as shown in Figure 1, two upon each side of the middle line of the machine. Links 10 are pivotally connected at 11 to said draft bars and project rearwardly therefrom and are secured to cross bars 12; there being one bar on each side of the machine in substantial alignment. Each bar is provided with U-shaped clamps 13 to engage the upright shanks 14 of horizontally arranged weed cutting knives 15 having cutting edges 16 which are adapted to sweep through the soil a few inches below the surface and completely sever and destroy weed stalks, roots and grasses which in any way will interfere with the propagation of seeds or the growth of plants. The knives and their shanks are preferably made integral, but may be separated, if preferred, and the knives are capable of vertical adjustment in the U-bolts and may be lifted clear of the ground by raising the links 10, each group of knives being raised separately, as shown. This raising is accomplished by levers 17 pivoted at 18 on the standards 6 and having rearwardly projecting ends 18 which are adjustably connected with the cross bars 12 by links 20 having a series of holes 21 at one end for vertical adjustment and pivotally connected at 22 to the bars 12. The lever 17 has a forward upwardly turned portion within convenient reach of the driver on the seat 23 and bars 24 have ratchet-like latch devices 25 for holding the levers in their adjusted positions, as indicated by dotted lines in Figure 3.

The knives operate in the rear of the discs a few inches below the surface of the ground, as shown in Figure 3, and each knife blade will be substantially horizontal and its cutting edge will have a shear cut on the stalks and roots of weeds and such grass as the operator may wish to destroy. All this will be accomplished at such a depth that the cut stalks and roots will not to any extent grow again.

The operator of the machine may raise the knife blades to lift them entirely clear of the soil, or one group may be raised and the other allowed to remain in its working position. I may also adjust the shanks of the knives vertically in their supports so that the depth of the cut may be regulated. The number and size of the blades may, of course, be increased or decreased as desired and still be within the scope of my invention.

I claim as my invention:

1. The combination, with a frame and ground working implements mounted therein, of horizontal draft links pivotally connected at their forward ends with said frame, transverse bars connected with the rear ends of said links, upright shanks mounted in said bars and provided at their lower ends with horizontal blades having weed cutting edges adapted to slide through the soil below the surface and means mounted on said frame for raising and lowering said bars and knives, said cutting edges being arranged obliquely to the line of draft of the machine.

2. A machine of the class described comprising a frame, ground-working implements mounted therein, links pivotally connected with said frame and projecting rearwardly therefrom, bars connected with said links, knives having upright shanks adjustable on said bars and provided with horizontal cutting blades adapted to slide through the soil and move obliquely to the direction of travel of the machine, levers pivoted in said frame and having rearwardly projecting ends, links adjustably connecting said levers with said bars, the forward end of said levers having hand grips and means for holding them in their adjusted positions.

In witness whereof, I have hereunto set my hand this 20th day of March, 1922.

JOHN COPPINGER.